(12) United States Patent
Duggan et al.

(10) Patent No.: US 10,634,269 B2
(45) Date of Patent: Apr. 28, 2020

(54) ELECTRICALLY ISOLATING BLOCK AND FLANGE FOR RAIL-HEATING DUCT

(71) Applicant: Thermon Heating Systems, Inc., Edmonton, Alberta (CA)

(72) Inventors: Chris Duggan, Edmonton (CA); Logan Brauer, Edmonton (CA); Graham Millard, Edmonton (CA)

(73) Assignee: Thermon Heating Systems, Inc., Edmonton (CA)

( * ) Notice: Subject to any disclaimer, the term of this patent is extended or adjusted under 35 U.S.C. 154(b) by 50 days.

(21) Appl. No.: 15/460,549

(22) Filed: Mar. 16, 2017

(65) Prior Publication Data

US 2018/0010720 A1    Jan. 11, 2018

Related U.S. Application Data

(60) Provisional application No. 62/359,808, filed on Jul. 8, 2016.

(30) Foreign Application Priority Data

Mar. 10, 2017   (CA) ..................................... 2960633

(51) Int. Cl.
*F16L 25/02*    (2006.01)
*F16L 23/00*    (2006.01)
(Continued)

(52) U.S. Cl.
CPC ........... *F16L 23/006* (2013.01); *F16L 23/036* (2013.01); *F16L 23/14* (2013.01); *F16L 25/026* (2013.01); *E01B 7/24* (2013.01)

(58) Field of Classification Search
CPC ....... F16L 23/14; F16L 23/02; F16L 25/0009; F16L 25/026
See application file for complete search history.

(56) References Cited

U.S. PATENT DOCUMENTS

| 468,773 | A | * | 2/1892 | McCarthy | ............. | F16L 25/026 |
|   |   |   |   |   |   | 285/50 |
| 500,488 | A | * | 6/1893 | Gratiaa | ................. | F16L 25/026 |
|   |   |   |   |   |   | 285/50 |

(Continued)

FOREIGN PATENT DOCUMENTS

| EP | 0113948 |   | 7/1984 |   |   |
| GB | 746989 | A * | 3/1956 | ............ | F16L 25/026 |
| GB | 977133 |   | 12/1964 |   |   |

OTHER PUBLICATIONS

Canadian Intellectual Property Office, Office Action and Examination Search Report to Canadian Patent Application No. 2,960,633, dated May 14, 2018, 3 pages.

*Primary Examiner* — David Bochna
(74) *Attorney, Agent, or Firm* — Faegre Drinker Biddle & Reath LLP

(57) ABSTRACT

An electrically isolating duct-connecting block for connecting two ducts, the duct-connecting block including a rigid, generally rectangular duct-like structure having upper and lower walls and side walls that match a cross-sectional size of a tie duct, the structure being made of an electrically nonconductive material. The block also includes a plurality of threaded fasteners embedded within the structure. Also disclosed is an electrically isolating nozzle-mounting block for mounting a nozzle to a tie duct, the nozzle-mounting block comprising a rigid flange-like structure having peripheral mounting holes and a central circular passage for conveying air to the nozzle, the structure being made of an electrically nonconductive material. The block also includes a plurality of threaded fasteners partially embedded within the structure. The blocks may be made of ultrahigh molecular weight polyethylene or any electrically and mechanically equivalent material.

3 Claims, 10 Drawing Sheets

(51) Int. Cl.
*F16L 23/036* (2006.01)
*F16L 23/14* (2006.01)
*E01B 7/24* (2006.01)

(56) References Cited

U.S. PATENT DOCUMENTS

| | | | | |
|---|---|---|---|---|
| 5,078,431 | A * | 1/1992 | Hale | F16L 25/026 |
| | | | | 285/47 |
| 5,236,228 | A * | 8/1993 | Lawton | F16L 25/14 |
| | | | | 285/148.25 |
| 5,944,060 | A * | 8/1999 | MacKay | F16L 23/14 |
| | | | | 138/137 |
| 9,033,286 | B2 | 5/2015 | Fox | |
| 9,470,348 | B1 * | 10/2016 | Bass | F16L 23/02 |
| 2007/0145190 | A1 * | 6/2007 | Villegas | B64D 37/32 |
| | | | | 244/135 R |
| 2008/0080080 | A1 * | 4/2008 | Armstrong | F16J 12/00 |
| | | | | 359/894 |
| 2013/0207377 | A1 * | 8/2013 | Cavagna | F16L 25/026 |
| | | | | 285/47 |
| 2014/0239128 | A1 | 8/2014 | Fox | |
| 2014/0242896 | A1 * | 8/2014 | Plessner | B64C 1/1453 |
| | | | | 454/71 |

\* cited by examiner

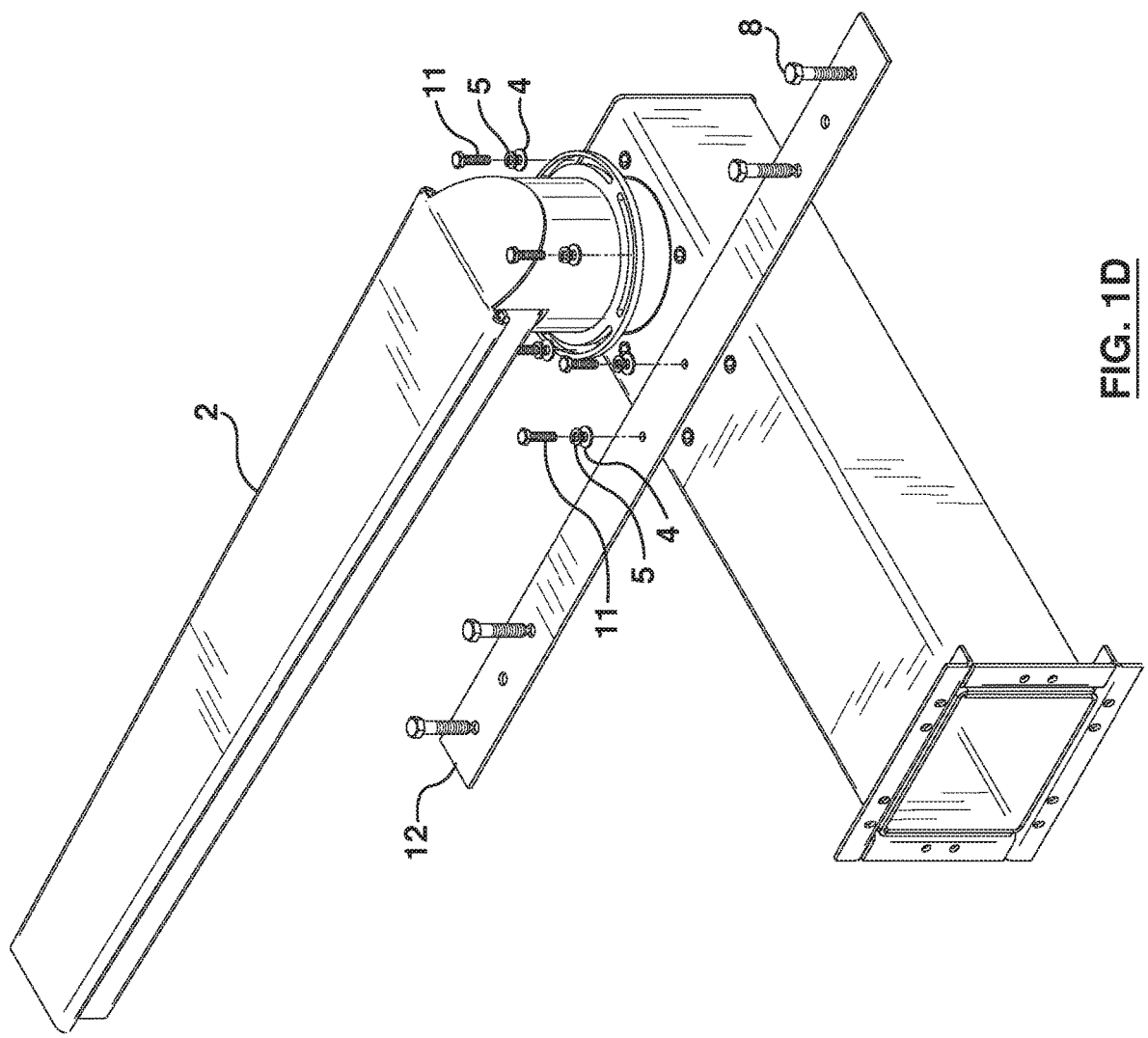

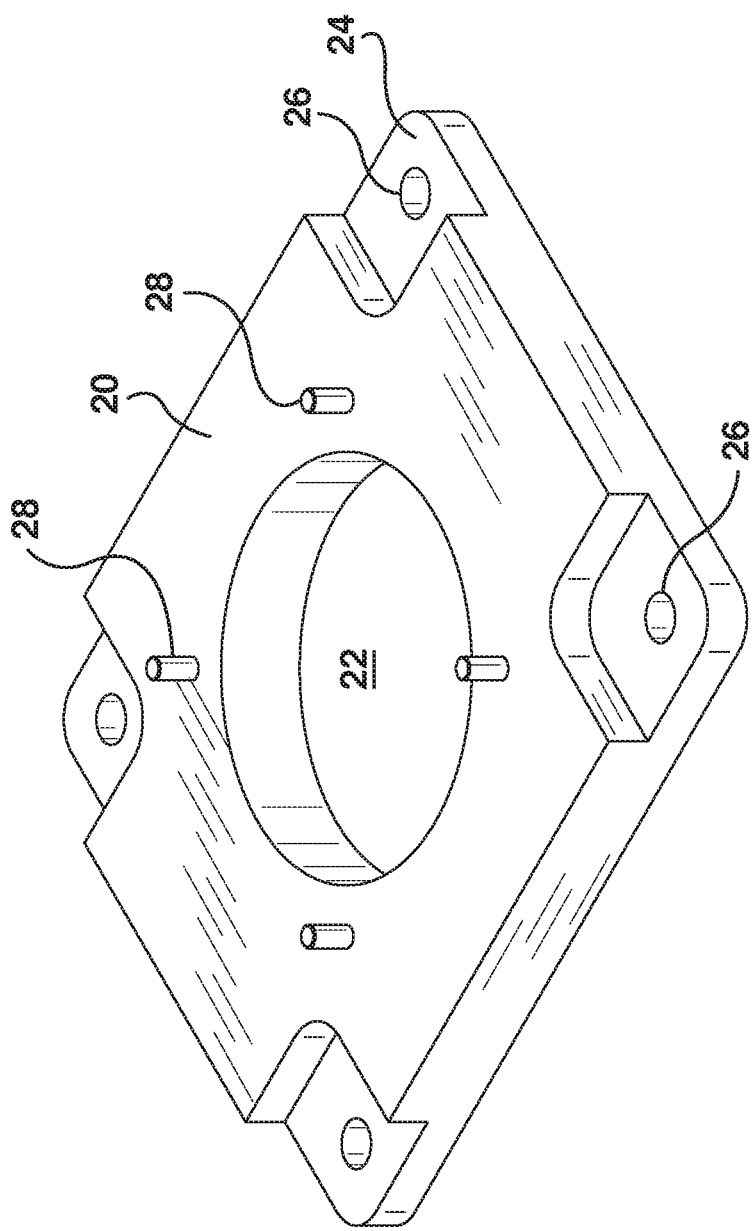

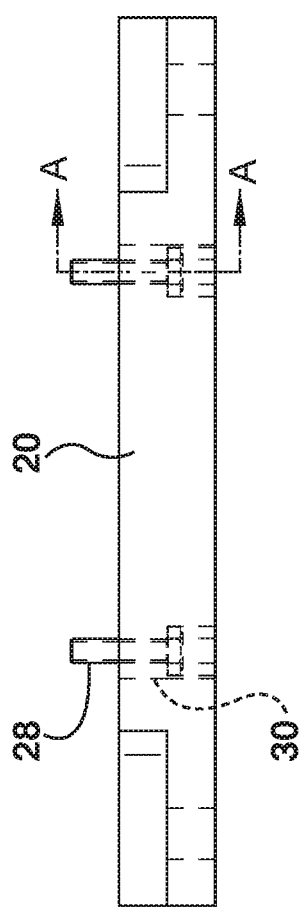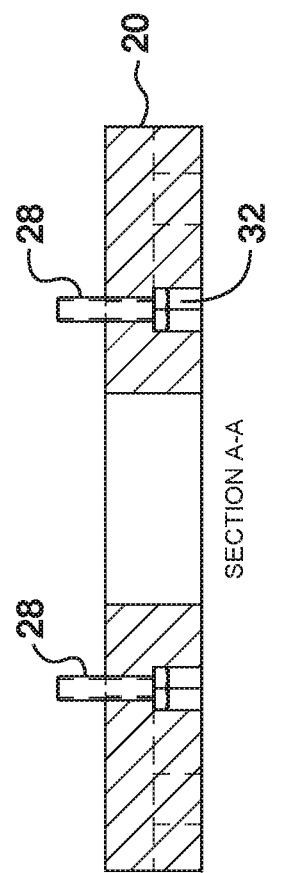

ELECTRICALLY ISOLATING BLOCK AND FLANGE FOR RAIL-HEATING DUCT

CROSS-REFERENCE TO RELATED APPLICATION

The present application claims priority from Canadian Patent Application No. 2,960,633 filed Mar. 10, 2017 and U.S. Provisional Patent Application 62/359,808 filed Jul. 8, 2016, the entire disclosure of which is hereby expressly incorporated herein by reference.

TECHNICAL FIELD

The present invention relates generally to rail heaters for railway tracks and, in particular, to rail tie ducts for conveying heat to melt snow and ice from railway tracks.

BACKGROUND

In typical railroad systems, sections of track are connected electrically into circuits for control, monitoring, heating and/or maintenance purposes. Each track section forms a track circuit in which the track rails are utilized to carry an electrical signal. In some cases, the track rails in each section are electrically insulated from the track rails of adjacent track sections such that each circuit may be utilized individually for control and monitoring.

Monitoring the track circuit provides a means for detecting the presence or absence of a train, railroad vehicle, equipment and/or any foreign apparatus that activates or otherwise interacts with a given track section. For instance, it is customary to detect the presence of a railroad vehicle in a particular track section by detecting the presence of a short circuit or other variation in a signal being monitored through the rails of the parallel tracks.

In addition to the monitoring circuitry, it is common in northern climates for the railway tracks to have a heating system to melt snow and ice, particularly for the movable point blades at rail switches. Various track heating systems are known, including gas or electric forced air systems which blow hot air through a rail tie duct to melt snow and ice from the railway tracks. The tie duct is installed orthogonally beneath the rails, like any other rail tie, to support and connect the pair of parallel rails.

In a forced air system used to remove snow from point rails on railway tracks, the tie duct must be electrically isolated from each track, so as to prevent a short circuit from occurring and causing a potential false alarm for signalling and monitoring purposes.

Prior-art technologies used in the rail industry involve gaskets made from rubber and other electrically insulating materials. Not only do these gaskets complicate assembly and disassembly for maintenance but they are also prone to failure over time due to vibration and weathering.

An improved technology for electrically isolating the duct from the track would be highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general, the present invention provides an electrically isolating block for a rail tie duct. The isolation block connects the tie duct to a flex duct or connects two sections of tie ducts together. The isolation block is both electrically isolating and structural. This isolation block eliminates the need for gaskets. The present invention also provides a point nozzle mounting block (or flange) that also electrically isolates the tie duct for mounting the point nozzle to the top of a tie duct.

Accordingly, one inventive aspect of the present disclosure is an electrically isolating duct-connecting block for connecting two ducts, the duct-connecting block including a generally rectangular duct-like structure having upper and lower walls and side walls that match a size of a tie duct, the structure being made of an electrically nonconductive material, wherein the structure is capable of supporting weight. The block also includes a plurality of threaded fasteners embedded within the structure.

Another inventive aspect of the present disclosure is a point nozzle mounting block (or flange) for mounting a point nozzle to the tie duct.

BRIEF DESCRIPTION OF THE DRAWINGS

Further features and advantages of the present invention will become apparent from the following detailed description, taken in combination with the appended drawings in which:

FIG. 1D illustrates an adjustable discharge nozzle (or point nozzle) mounted to a tie duct.

FIG. 3A is an isometric view of a point nozzle mounting block in accordance with another embodiment of the present invention.

FIG. 3C is a side view of the mounting block.

FIG. 3D is a cross-sectional view of the mounting block taken through section A-A of FIG. 3C.

It will be noted that throughout the appended drawings, like features are identified by like reference numerals.

DETAILED DESCRIPTION

Figure 1A:
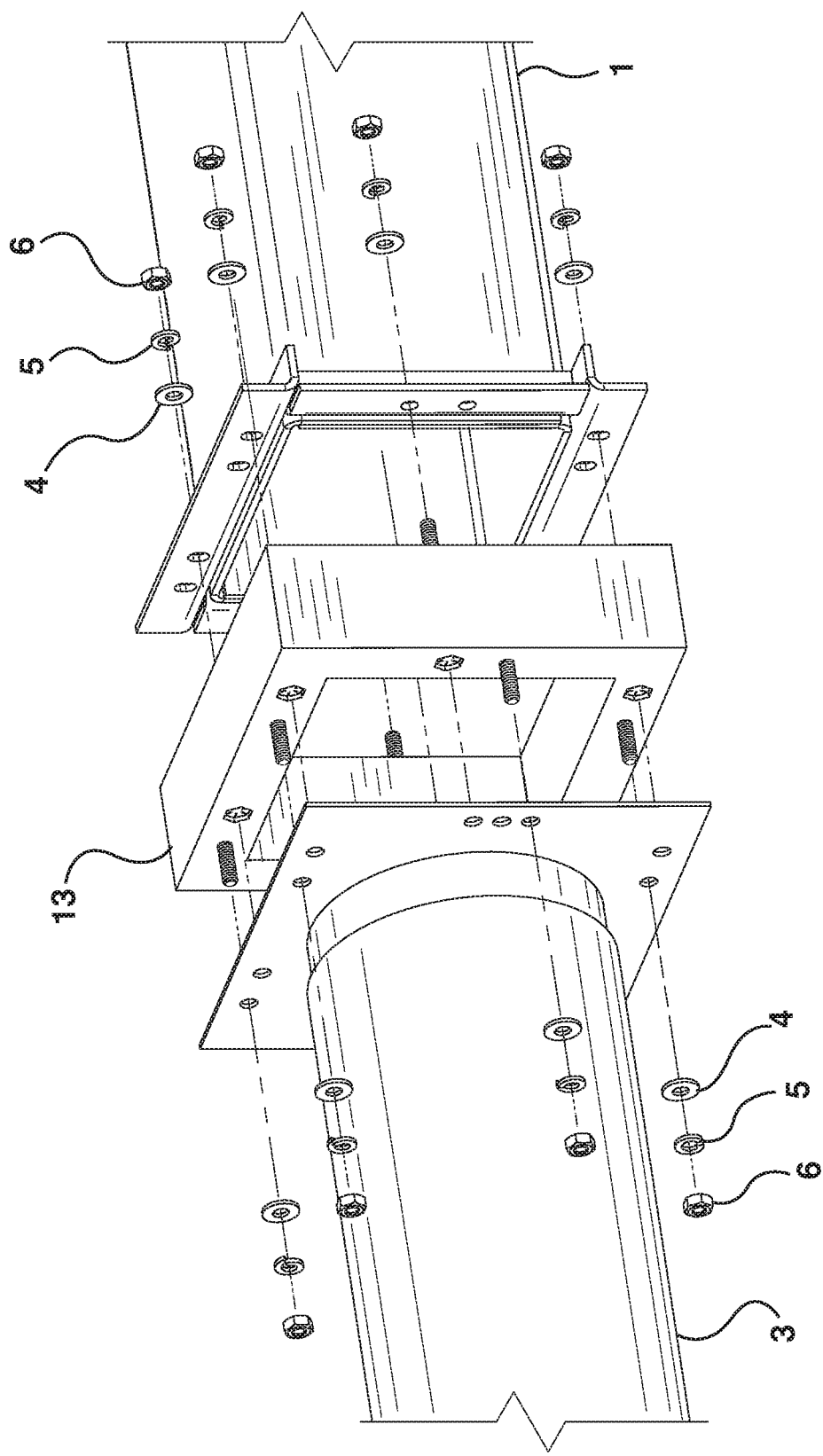
FIG. 1A illustrates an isolation block used to connect a tie duct to a flex duct in accordance with an embodiment of the present invention.
Figure 1B:
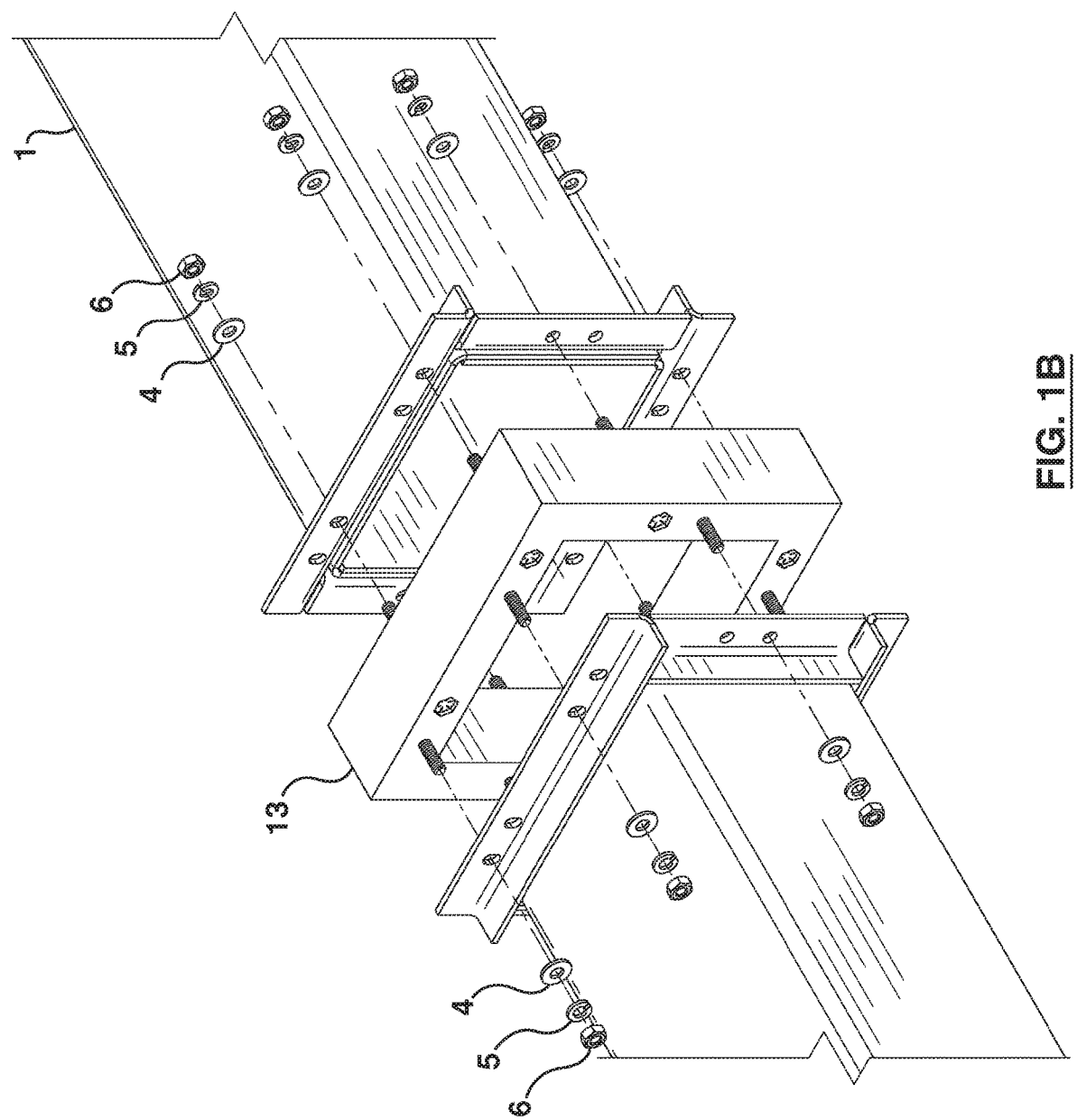
FIG. 1B illustrates an isolation block used to connect two tie ducts in accordance with an embodiment of the present invention.
Figure 1C:
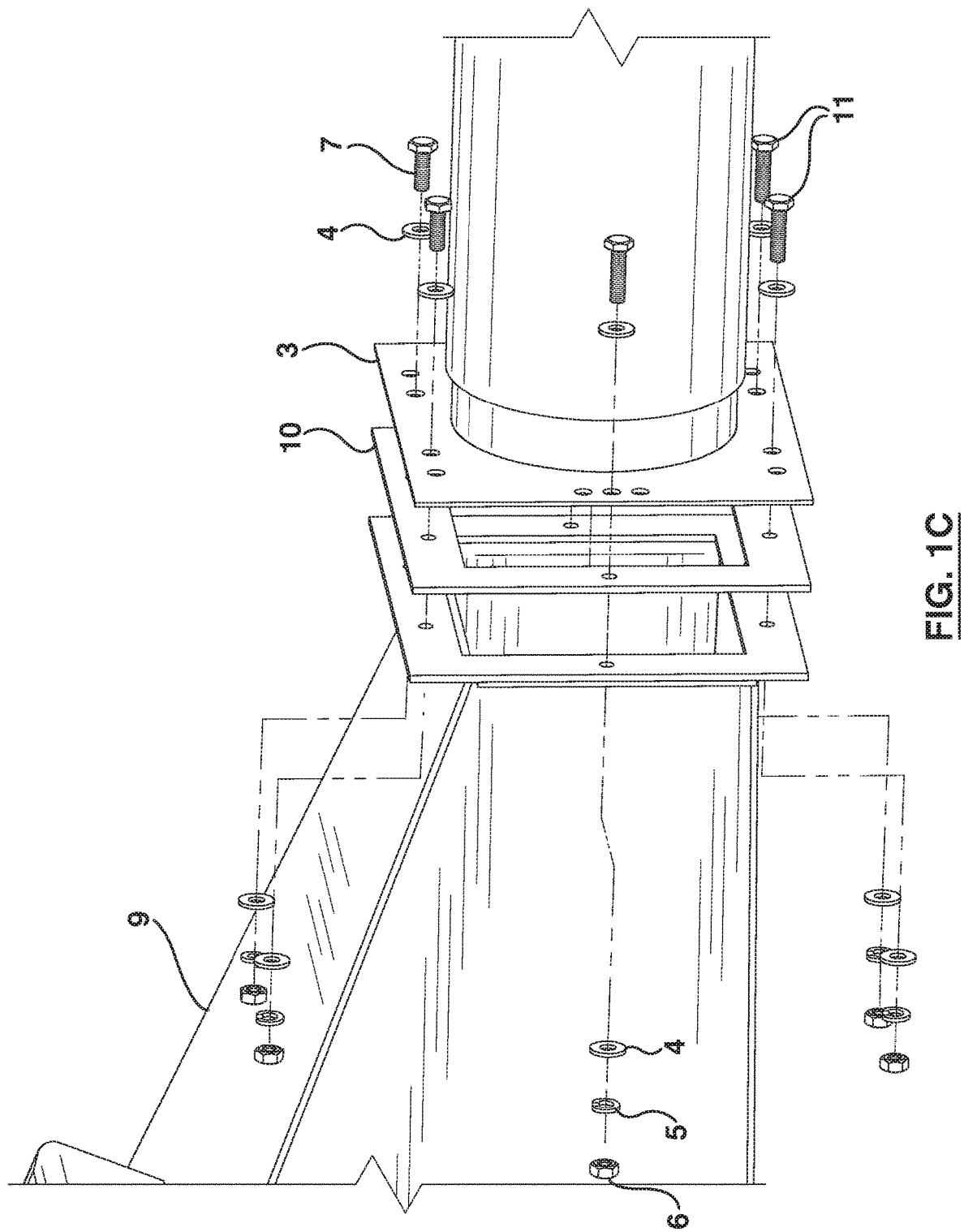
FIG. 1C illustrates the flex duct of FIG. 1 connected to a heating element.

In the embodiment illustrated by way of example in FIG. 1A, a ducting system ("ducting package") for a rail tie duct is shown. The ducting system is part of a heating system that would also includes a heater (which may be gas or electric) and a blower (or fan). The ducting system includes a novel electrically isolating block designated by reference numeral 13. The block may be used to connect a tie duct 1 to a flex duct 3 as shown in FIG. 1A. Alternatively, as shown in FIG. 1B, the electrically isolating block 13 may be used to join two tie ducts (or duct sections). The tie duct 1 may be made of galvanized steel and is thus electrically conductive. The isolating block 13 thus isolates the two rails while providing structural integrity to the tie duct 1. As shown in FIG. 10, the flex duct 3 may be connected at one end to a heating element 9. As shown in FIG. 1D, the tie duct 1 may include a discharge nozzle 2 (or a point nozzle). The discharge nozzle 2 may be rotatable about its base to enable it to be turned and pointed in a desired direction. As further shown by way of example in FIGS. 1A-1D, the ducting system in this illustrated embodiment is assembled using washers 4, lockwashers 5, nuts 6, bolts 7, 11 and lag bolts 8. In this illustrated embodiment, a gasket 10 is inserted between the flange of the flex duct 3 and the flange of the heating element 9. As illustrated by way of example in FIG. 1D, a tie strap 12 may be fastened by bolts 11 to an upper surface of the tie duct 1 such that the tie strap 12 is orthogonal to the tie duct 1.

Figure 2A:
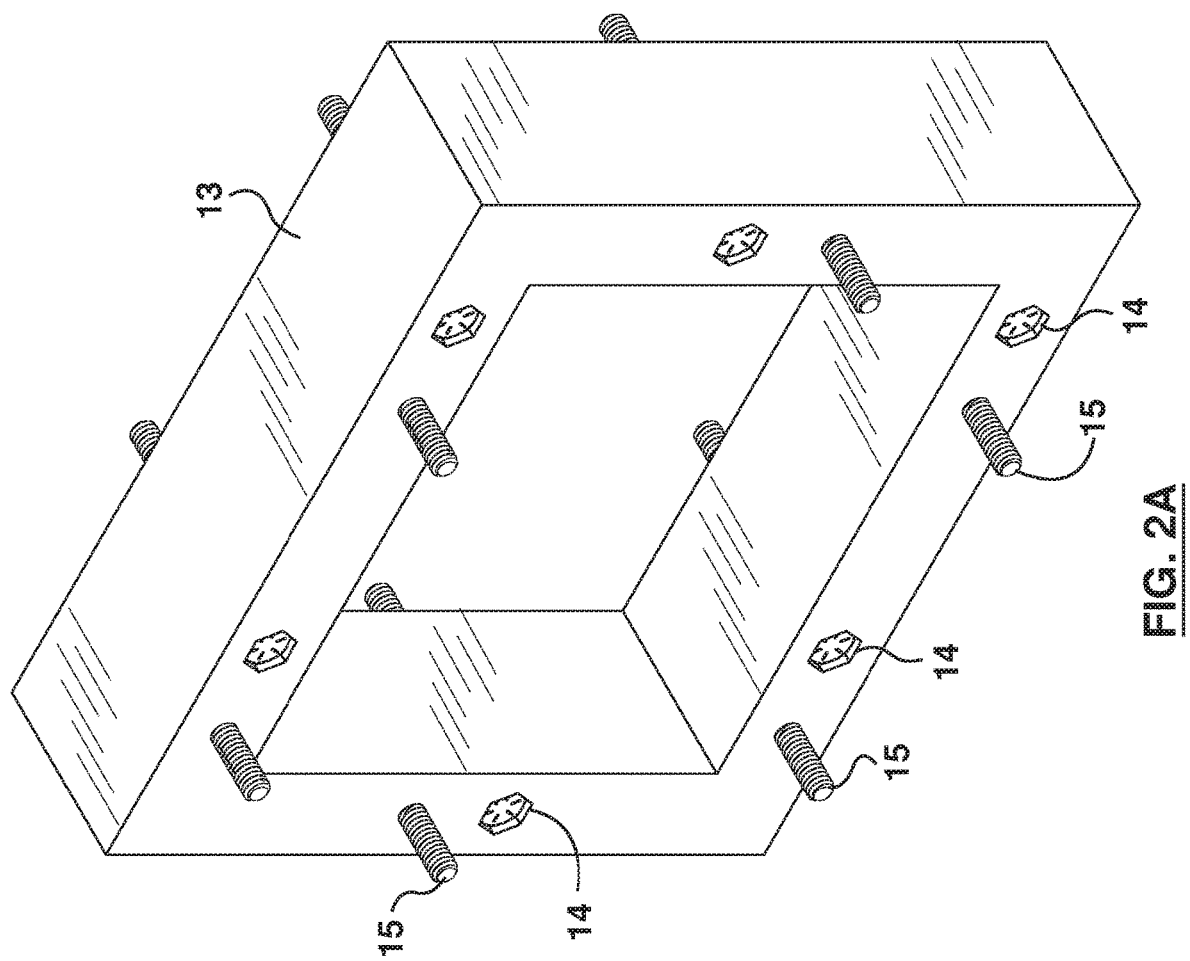
FIG. 2A is an isometric view of the isolation block introduced in FIG. 1A and FIG. 1B.
Figure 2C:
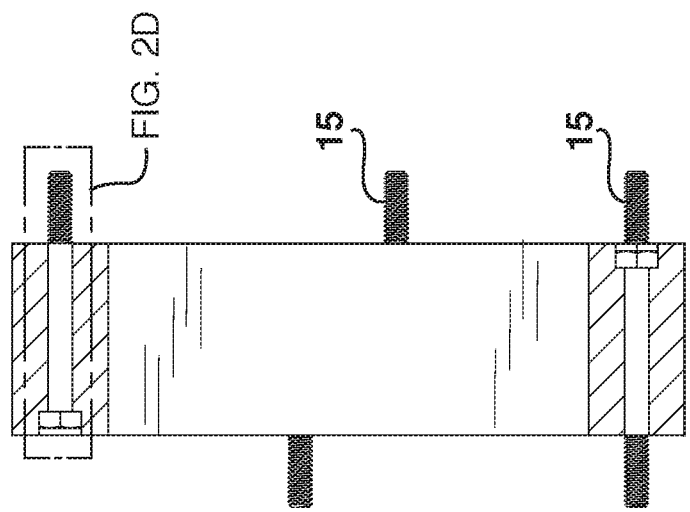
FIG. 2C is a cross-sectional view of the isolation block taken through section A-A in FIG. 2B.
Figure 2B:
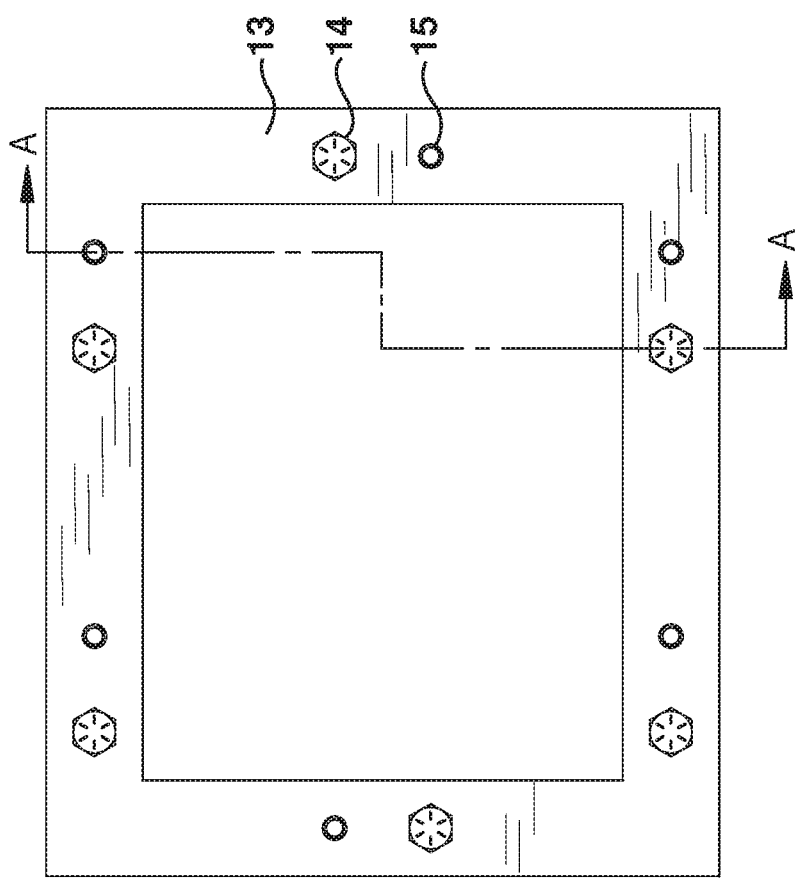
FIG. 2B is a front view of the isolation block of FIG. 2A.
Figure 2D:
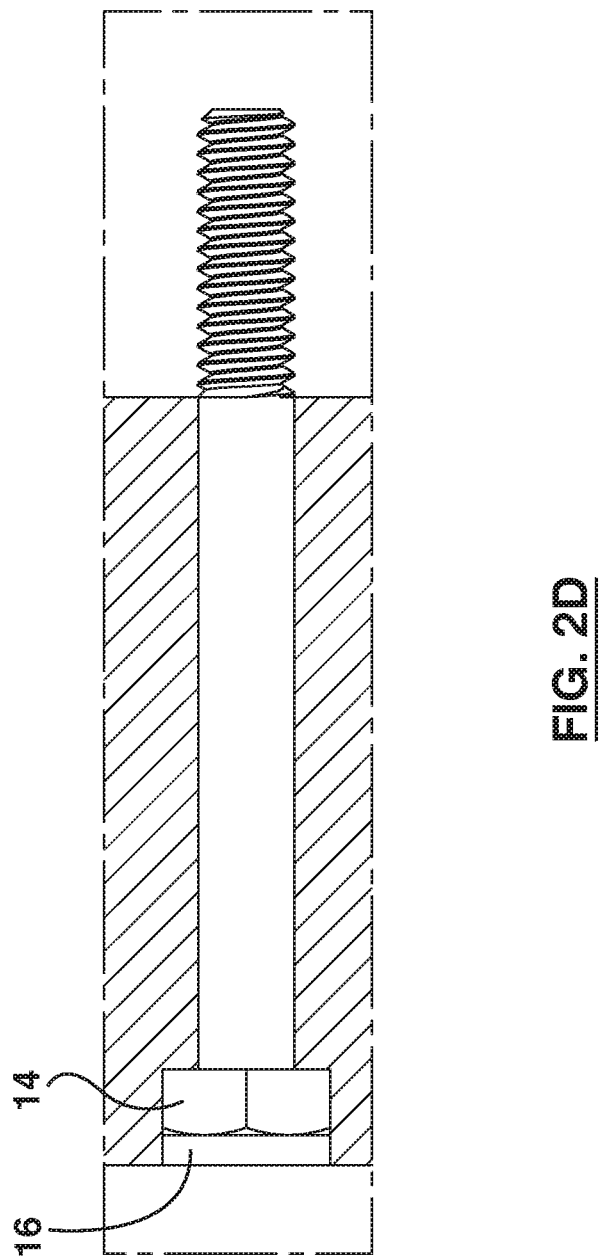
FIG. 2D is an enlarged view of Detail B of FIG. 2C.

The isolation block 13 is shown in greater detail in FIGS. 2A-2D. As shown in FIG. 2A, the isolation block 13 is a rigid rectangular duct-like member having upper, lower and side walls defining a central rectangular passageway. The upper, lower and side walls in the illustrated embodiment have uniform wall thickness but this is not essential. The isolation block 13 has partially embedded bolts (or other partially embedded threaded fasteners or threaded shafts). The bolts keep the ducting together. Holes are machined in multiple locations around the perimeter of the block. In the embodiment illustrated in FIGS. 2A-2D, there are twelve holes in total with six holes housing six fasteners pointing in a first direction while the other six holes house six other fasteners pointing in the opposite direction. Although twelve holes and twelve fasteners are shown in the drawings, the number of holes and fasteners and their exact locations may be varied in other embodiments. The holes are recessed, e.g. countersunk, and sealed (e.g. by epoxy or an equivalent dielectric sealant) so as to be secured within the isolation block. In the illustrated embodiment, the heads 14 of each of the bolts is thus covered with epoxy sealant 16 as best shown in FIG. 2D. As such, only the threaded shafts 15 protrude from the block. The bolts are placed within the recessed holes and the tops (heads) are sealed (e.g. with epoxy or equivalent sealant) to create the isolation point within the isolation block. The isolation block thus becomes an integral and structural (i.e. load bearing) part of the duct.

The electrically isolating block (or "isolation block") 13 is made from a machinable electrically non-conductive (dielectric) material that provides a rigid structure for the isolation block. The isolation block 13 provides structural integrity to the tie duct and electrically isolates the rails so electrical current cannot flow from one rail to the other rail across the tie duct. In the embodiment of FIGS. 2A-2D, the isolation block 13 is made of ultrahigh molecular weight (UHMW) polyethylene. It will be appreciated that the isolation block may be made of a substitute material having electrically and mechanically equivalent properties. For example, UHMW polyethylene has a modulus of elasticity of about 80,000 psi and a flexural modulus of about 90,000-110,000 psi. UHMW polyethylene has a tensile strength of about 3000-6000 psi. UHMW polyethylene has a dielectric constant of 2.3. A mechanically and dielectrically suitable material within +/−30% of these values can be considered equivalent for the purposes of substitution. Preferably, a substituted material should be within +/−20% of these values. More preferably, a substituted material should be within +/−10% of these values.

In the illustrated embodiment, the isolation block 13 has a width greater than its height. Although in the illustrated embodiment, the width-to-height ratio is 8:7, this ratio may be varied depending on the size of the tie duct. In the illustrated embodiment, the depth-to-height ratio is 2:7 although it will be appreciated that the depth of the isolation block may be varied provided both the electrical isolation and mechanical support are achieved. The depth of the isolation block is measured in an airflow direction. The wall thickness (not to be confused with the depth) is uniform for the upper, lower and side walls in this embodiment, as was noted above. The ratio of the wall thickness to the height of the isolation block is 1:7. The spacing between adjoining pairs of oppositely oriented bolts is also uniform in this embodiment. The spacing to height ratio is 1:7. Thus, in this embodiment, there is a 1:1 ratio between the spacing and the wall thickness. These ratios may vary +/−30% in some other embodiments.

Figure 3B:
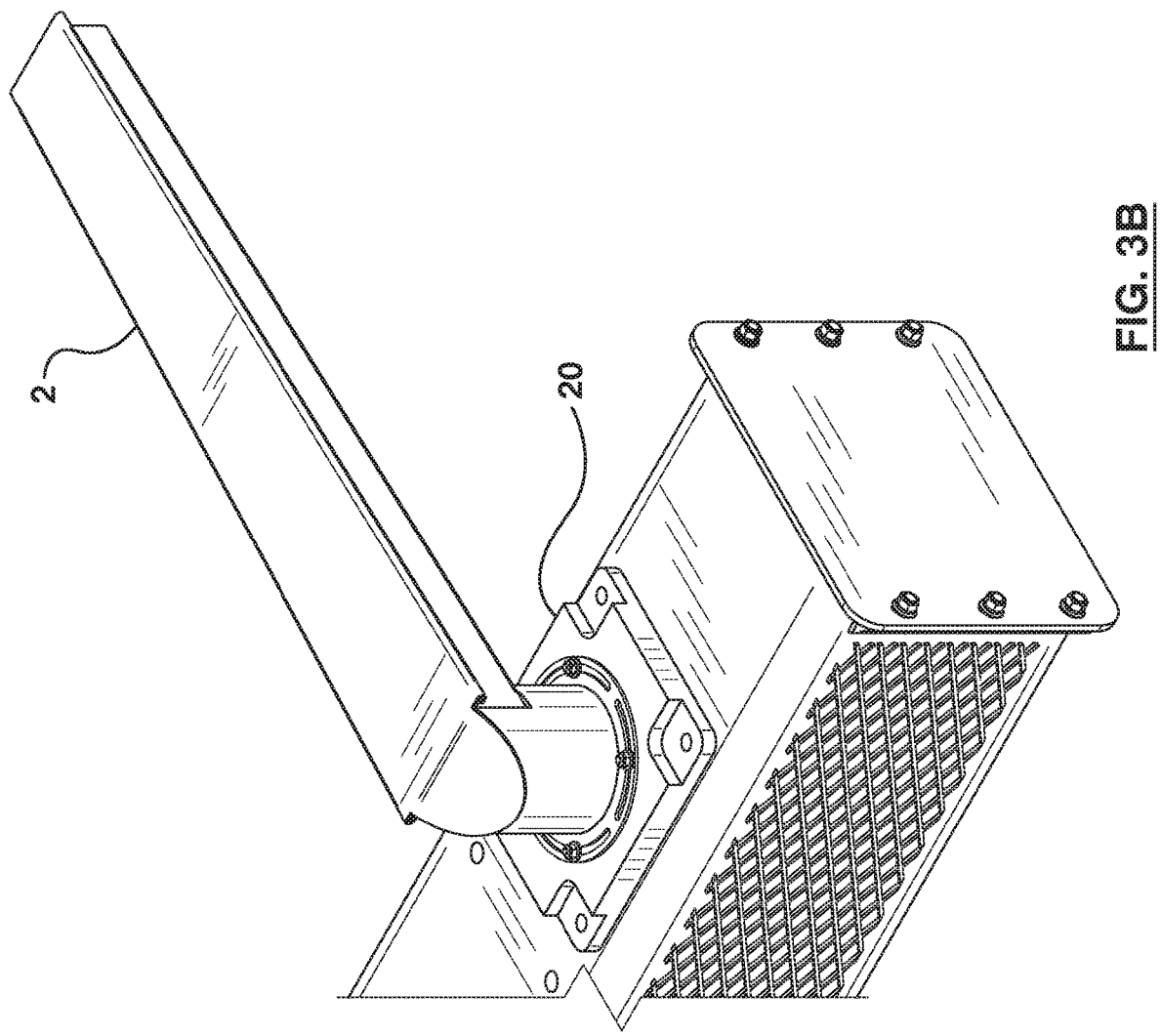
FIG. 3B depicts the point nozzle mounted to a tie block using the mounting block.

In the embodiment depicted by way of example in FIGS. 3A-3D, the ducting system may include an electrically isolating mounting block (or mounting flange) 20 for mounting the adjustable point nozzle 2 to the tie duct 1. An example mounting flange 20 is shown in FIG. 3A. As shown by way of example in FIG. 3B, the mounting flange 20 is mounted to an upper surface of the tie duct 1 to receive the adjustable point nozzle 2. The mounting flange 20 electrically isolates the adjustable point nozzle 2 from the tie duct 1. As shown in FIG. 3C and in FIG. 3D, bolts are partially embedded inside the mounting flange such that heads 30 of the bolts 28 are sealed with epoxy 32. In the illustrated embodiment, there are four partially embedded bolts 28 protruding upwardly from the mounting flange 20. The mounting flange 20 also has peripheral mounting holes 26 at corners 24 and a central circular passage 22 for conveying air to the nozzle. The mounting flange 20 may be made of an electrically nonconductive material such as ultrahigh molecular weight polyethylene or an equivalent material.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept (s) presented herein. The scope of the exclusive right sought by the Applicant(s) is therefore intended to be limited solely by the appended claims.

The invention claimed is:
1. An electrically isolating duct-connecting block for connecting two ducts, the duct-connecting block comprising:
   a generally rectangular rigid duct-like structure having upper and lower walls and side walls that substantially match a cross-sectional size of the ducts, the structure being made of an electrically nonconductive material; and a plurality of threaded fasteners partially embedded within the structure, each of the plurality of threaded fasteners having a head, the head of each of the plurality of threaded fasteners electrically isolated by a dielectric sealant, each of the plurality of threaded fasteners having a threaded portion, a first threaded portion of a first threaded fastener of the plurality of threaded fasteners extending in a first direction, a second threaded portion of a second threaded fastener of the plurality of threaded fasteners extending in a second direction opposite the first direction.

2. The duct-connecting block of claim 1 wherein the head of the each of the plurality of threaded fasteners are electrically isolated by an epoxy sealant.

3. The duct-connecting block of claim 1 wherein the structure is made of ultrahigh molecular weight (UHMW) polyethylene.

\* \* \* \* \*